US006609388B1

(12) United States Patent (10) Patent No.: US 6,609,388 B1
Hanson (45) Date of Patent: Aug. 26, 2003

(54) METHOD OF DEFROSTING AN EVAPORATOR COIL OF A TRANSPORT TEMPERATURE CONTROL UNIT

(75) Inventor: Jay L. Hanson, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/147,734

(22) Filed: May 16, 2002

(51) Int. Cl.$^7$ .............................................. F25D 21/06
(52) U.S. Cl. ............................ 62/151; 62/80; 62/239
(58) Field of Search ........................... 62/80, 150, 151, 62/155, 234, 239, 140, 128

(56) References Cited

U.S. PATENT DOCUMENTS 4,172,493 A * 10/1979 Jacobs ......................... 165/42

* cited by examiner

*Primary Examiner*—Melvin Jones
(74) *Attorney, Agent, or Firm*—Michael Best & Friedrich LLP

(57) ABSTRACT

The invention provides a method of defrosting an evaporator coil of a transport temperature control unit. The transport temperature control unit may be operable to circulate refrigerant through the evaporator coil for cooling a conditioned space within a transportable vehicle and may be operable to maintain an air temperature of the conditioned space within a range of a desired temperature. The method may include sensing the air temperature of the conditioned space, enabling a warm load defrost when the air temperature of the conditioned space is greater than the desired temperature, initiating a first defrost cycle for removing condensate from the evaporator coil and terminating the first defrost cycle. The first defrost cycle has a defrost duration time. The method may also include establishing a defrost interval time dependent on the defrost duration time and initiating a second defrost cycle after the defrost interval time expires.

28 Claims, 6 Drawing Sheets

METHOD OF DEFROSTING AN EVAPORATOR COIL OF A TRANSPORT TEMPERATURE CONTROL UNIT

FIELD OF THE INVENTION

The present invention relates to a method of defrosting and, more particularly, to a method of defrosting an evaporator coil of a transport temperature control unit.

BACKGROUND OF THE INVENTION

Straight trucks and tractor-trailers are often used as a means to transport cargo that must be maintained at a predetermined or desirable temperature during transportation in order to preserve the quality of the cargo. This cargo may be food, agricultural goods or various other temperature critical items. Hereinafter, any vehicle that transports cargo that must be maintained at a predetermined temperature during transportation will be referred to as a transportable vehicle or a transport vehicle. Hereinafter, the term cargo means any item that is transported, stored or otherwise supported within a conditioned space of a transport vehicle that must be maintained at a predetermined temperature.

Transport vehicles that transport such temperature sensitive cargo include a conditioned space. The temperature within the conditioned space is controlled within a temperature range adjacent to a selected thermal setpoint by a temperature control unit. Some transport vehicles have a plurality of conditioned spaces, which may be maintained at the same thermal setpoint or varying thermal setpoints by the unit.

The temperature control unit can be programmed to cool or heat the conditioned space to the thermal setpoint. Frost can build-up on the temperature control unit when the temperature control unit is cooling the conditioned space. More particularly, frost or condensate can build-up on an evaporator coil of the temperature control unit and decrease the efficiency of the temperature control unit while in the cooling mode. Defrost cycles are typically utilized to remove the condensate. A defrost cycle is performed by circulating a heated fluid through the evaporator coil. The heat from the fluid is passed to the evaporator coil, causing the condensate to melt. The temperature control unit returns to the cooling mode after defrosting and cools at a greater efficiency due to the decreased build-up of condensate on the evaporator coil.

Many varying types of defrost cycles exist and include manual defrost cycles, fixed time defrost cycles and static pressure defrost cycles. A person initiates and terminates a manual defrost cycle, while the fixed time defrost cycle initiates and terminates on a fixed timer that is programmable with a time period. The static pressure defrost cycle initiates when the static pressure across the evaporator coil reaches undesirable levels and terminates when the static pressure is at a desirable level.

SUMMARY OF THE INVENTION

One problem with the defrost cycle of the above-described temperature control unit is that the defrost cycle of the unit is initiated and terminated by a person.

Another problem with the defrost cycle of the above-described temperature control unit is that the defrost cycle of the unit operates on a fixed timer for varying environments and conditions within the conditioned space.

A further problem with the defrost cycle of the above-described temperature control unit is that the defrost cycle of the unit may operate based on an inaccurate static pressure reading.

The present invention provides a method of defrosting an evaporator coil of a transport temperature control unit that substantially alleviates one or more of the above-described and other problems.

More particularly, the invention provides a method of defrosting an evaporator coil of a transport temperature control unit. The transport temperature control unit may be operable to circulate refrigerant through the evaporator coil for cooling a conditioned space within a transportable vehicle and may be operable to maintain an air temperature of the conditioned space within a range of a desired temperature. The method includes providing a control sensor, sensing the air temperature of the conditioned space with the control sensor, comparing the air temperature and the desired temperature of the conditioned space, enabling a defrost cycle that is operable to remove condensate from the evaporator coil when the air temperature is greater than the desired temperature.

It is another feature of the invention to provide a method of defrosting an evaporator coil of the transport temperature control unit. The temperature control unit may be operable to circulate refrigerant through the evaporator coil for cooling a conditioned space within a transportable vehicle. The method includes initiating a first defrost cycle for removing condensate from the evaporator coil and terminating the first defrost cycle. The first defrost cycle has a defrost duration time. The method also includes establishing a defrost interval time dependent on the defrost duration time and initiating a second defrost cycle after the defrost interval time expires.

It is a further feature of the invention to provide a method of defrosting an evaporator coil of a transport temperature control unit. The transport temperature control unit may be operable to circulate refrigerant through the evaporator coil for cooling a conditioned space within a transportable vehicle and may be operable to maintain an air temperature of the conditioned space within a range of a desired temperature. The method includes sensing the air temperature of the conditioned space, enabling a warm load defrost when the air temperature of the conditioned space is greater than the desired temperature, initiating a first defrost cycle for removing condensate from the evaporator coil and terminating the first defrost cycle. The first defrost cycle has a defrost duration time. The method also includes establishing a defrost interval time dependent on the defrost duration time and initiating a second defrost cycle after the defrost interval time expires.

Figure 1:
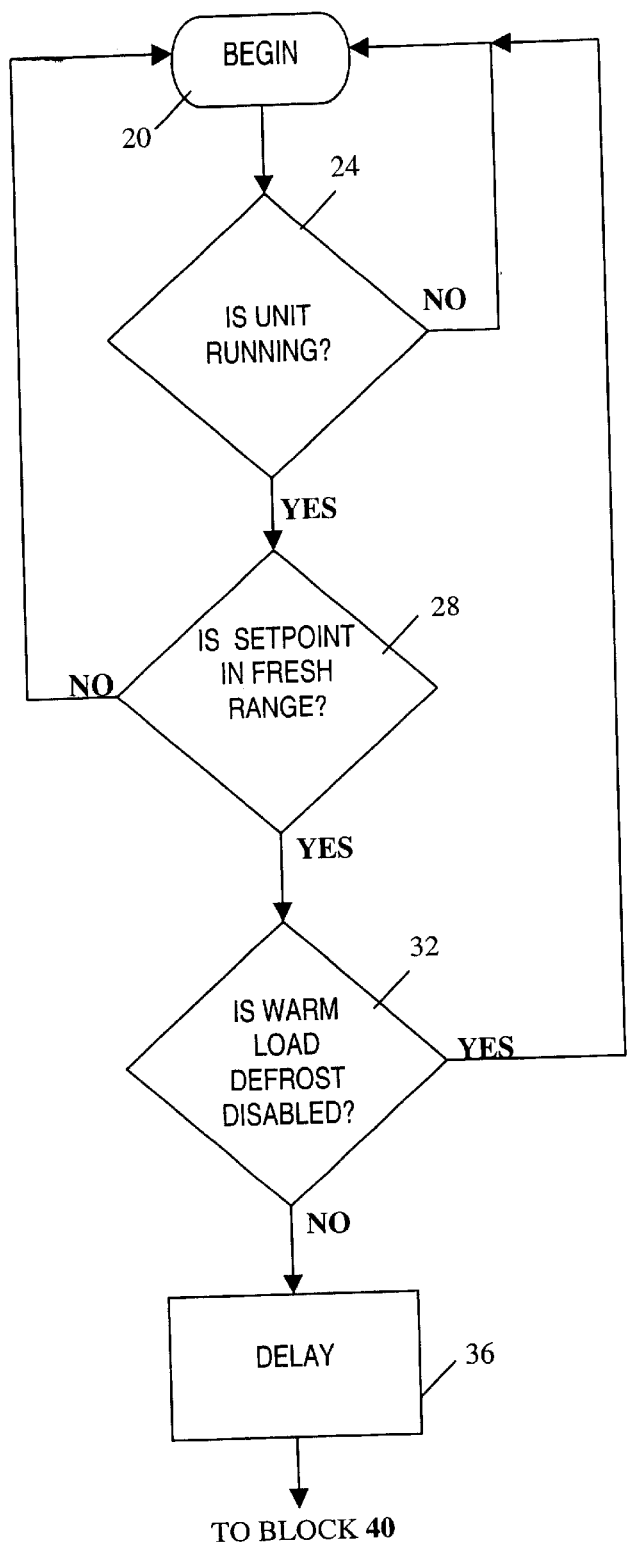
FIGS. 1–4 are flow charts showing an algorithm in the form of a computer program that can be used to practice a method of defrosting an evaporator coil of a transport temperature control unit.

Before an embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting. The

DETAILED DESCRIPTION OF THE PRESENT INVENTION

The present invention is used to defrost a transport temperature control unit. More particularly, the present invention is used to defrost an evaporator coil of the transport temperature control unit when warm cargo or a warm load is detected within a conditioned space of a transport vehicle. This kind of defrost can be considered warm load defrost.

The temperature control unit has a cool mode and a heat mode to respectively cool and heat the conditioned space. Defrosting of the evaporator coil is only necessary in the cool mode, therefore, only the cool mode will be discussed hereinafter.

Warm cargo loaded into the conditioned space typically has more moisture than cargo that is cooled prior to being loaded into the conditioned space. More condensate tends to form on the evaporator coil when warm cargo is loaded into the conditioned space than when cool cargo is loaded into the conditioned space.

A defrost cycle is generally used to defrost the evaporator coil and includes circulating warm fluid through the evaporator coil to remove condensate from the coil.

Referring to FIGS. 1–4, an algorithm in the form of a computer program that can be used to practice the method of a preferred embodiment is illustrated.

Referring to FIG. 1, the program begins as block 20. After block 20, the program proceeds to block 24 where the program determines if the temperature control unit is running. If the unit is not running (NO at block 24), the program returns to block 20. If the unit is running (YES at block 24), the program proceeds to block 28 where the program determines if the thermal setpoint is in a fresh temperature range. In a preferred embodiment of the present invention, the thermal setpoint is a selectable temperature programmable into the temperature control unit. The temperature control unit operates to maintain the conditioned space at the thermal setpoint. Also, in a preferred embodiment of the present invention, the temperature control unit includes a frozen temperature range and a fresh temperature range that are separated by a barrier temperature. Each range includes a range of temperatures on their respective sides of the barrier temperature. In a preferred embodiment of the present invention, the barrier temperature is 15° F., however, any barrier temperature may be used and still be within the intended scope of the present invention. The frozen and fresh temperature ranges include temperatures below and above the barrier temperature, respectively.

If the thermal setpoint is not in the fresh temperature range (NO at block 28), the program returns to block 20. If the thermal setpoint is in the fresh temperature range (YES at block 28), the program proceeds to block 32 where the program determines if the warm load defrost is disabled. When warm load defrost is disabled, a defrost cycle can not be initiated to remove condensate from the evaporator coil upon the temperature control unit sensing warm cargo in the conditioned space. If the warm load defrost is disabled (YES at block 32), the program returns to block 20. If the warm load defrost is not disabled (NO at block 32), warm load defrost is enabled and the program proceeds to block 36 where a delay occurs. When warm load defrost is enabled, a defrost cycle can initiate to remove condensate from the evaporator coil upon the temperature control unit sensing warm cargo in the conditioned space. The delay allows the unit to cool the conditioned space and stabilize the air temperature within the conditioned space after the cargo has been loaded into the conditioned space. In a preferred embodiment of the present invention, the delay is ten minutes, however, the delay may be any length of time and still be within the intended scope of the present invention. After the delay at block 36, the program proceeds to block 40.

Figure 2:
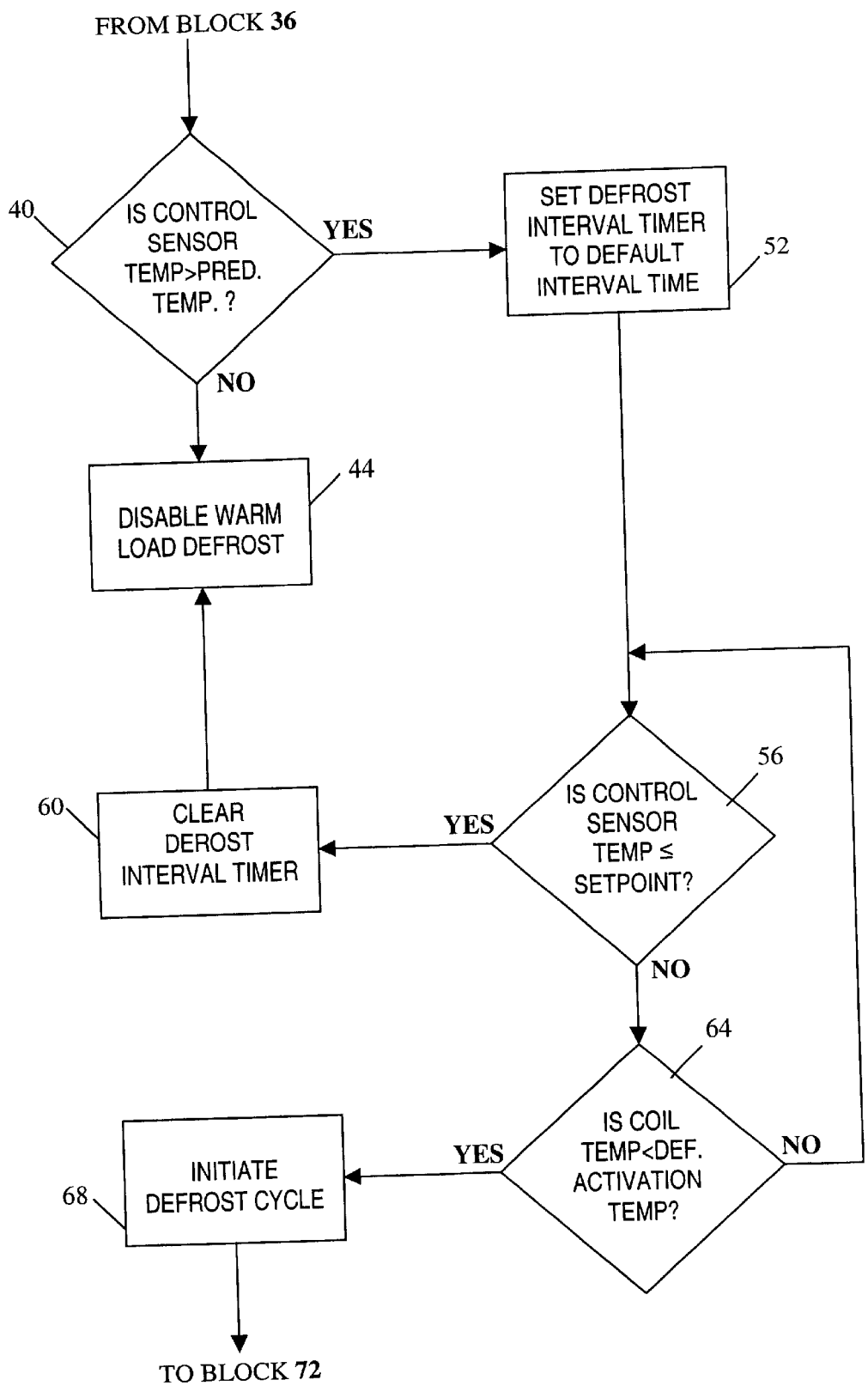

Referring to FIG. 2 and block 40, the program determines if the temperature sensed by a control sensor is greater than a predetermined temperature. The control sensor is positioned such that it can accurately monitor air temperature within the conditioned space. In a preferred embodiment of the present invention, the control sensor is positioned to monitor the air temperature of return air returning to the temperature control unit from the conditioned space, however, the control sensor may be positioned in other locations to monitor other air temperatures within the conditioned space and still be within the intended scope of the present invention. The predetermined temperature can be any temperature greater than the thermal setpoint. In a preferred embodiment of the present invention, the predetermined temperature is 15° F. above the thermal setpoint. This ensures that the warm load defrost will be enabled only when the control sensor temperature is greater than 15° F. above the thermal setpoint or, in other words, warm load defrost will be enabled when warm cargo is loaded into the conditioned space. If the program determines that the control sensor temperature is not greater than the predetermined temperature (NO at block 40), the program proceeds to block 44 where the warm load defrost is disabled.

Referring back to block 40, if the program determines that the control sensor temperature is greater than the predetermined temperature (YES at block 40), the program proceeds to block 52 where the interval timer is set to a default value or default interval time. The defrost interval timer determines a period of time between two defrost cycles. The period of time is also referred to as an interval time. After a first defrost cycle terminates, the interval timer initiates and runs until the interval timer reaches the interval time, at which point a second defrost cycle initiates (discussed in greater detail below). In a preferred embodiment of the present invention, the default interval time is 60 minutes, however, the default interval time may be any length of time and still be within the intended scope of the present invention.

After block 52, the program proceeds to block 56 where the program determines if the control sensor temperature is less than or equal to the thermal setpoint. If the control sensor temperature is less than or equal to the thermal setpoint (YES at block 56), the program proceeds to block 60 where the interval time is cleared or reset. After block 60, the program proceeds to block 44 where the warm load defrost is disabled.

Referring back to block 56, if the control sensor temperature is not less than or equal to the thermal setpoint (NO at block 56), the program proceeds to block 64 where the program determines if a coil temperature of the evaporator coil is less than a defrost activation temperature. A coil temperature control sensor is positionable to monitor the coil temperature of the evaporator coil. Coil temperature control sensors and monitoring coil temperatures is well known to those skilled in the art and therefore will not be discussed further herein. The defrost activation temperature determines the coil temperature at which the defrost cycle will initiate. The defrost cycle initiates when the coil temperature drops below the defrost activation temperature. In a preferred embodiment of the present invention, the defrost activation temperature is 42° F., however, the defrost activation temperature may be any temperature and still be within the intended scope of the present invention. If the coil temperature is not less than the defrost activation temperature (NO at block 64), the program returns to block 56. If the coil temperature is less than the defrost activation temperature (YES at block 64), the program proceeds to block 68 where the defrost cycle is initiated. After block 68, the program proceeds to block 72.

Figure 3:
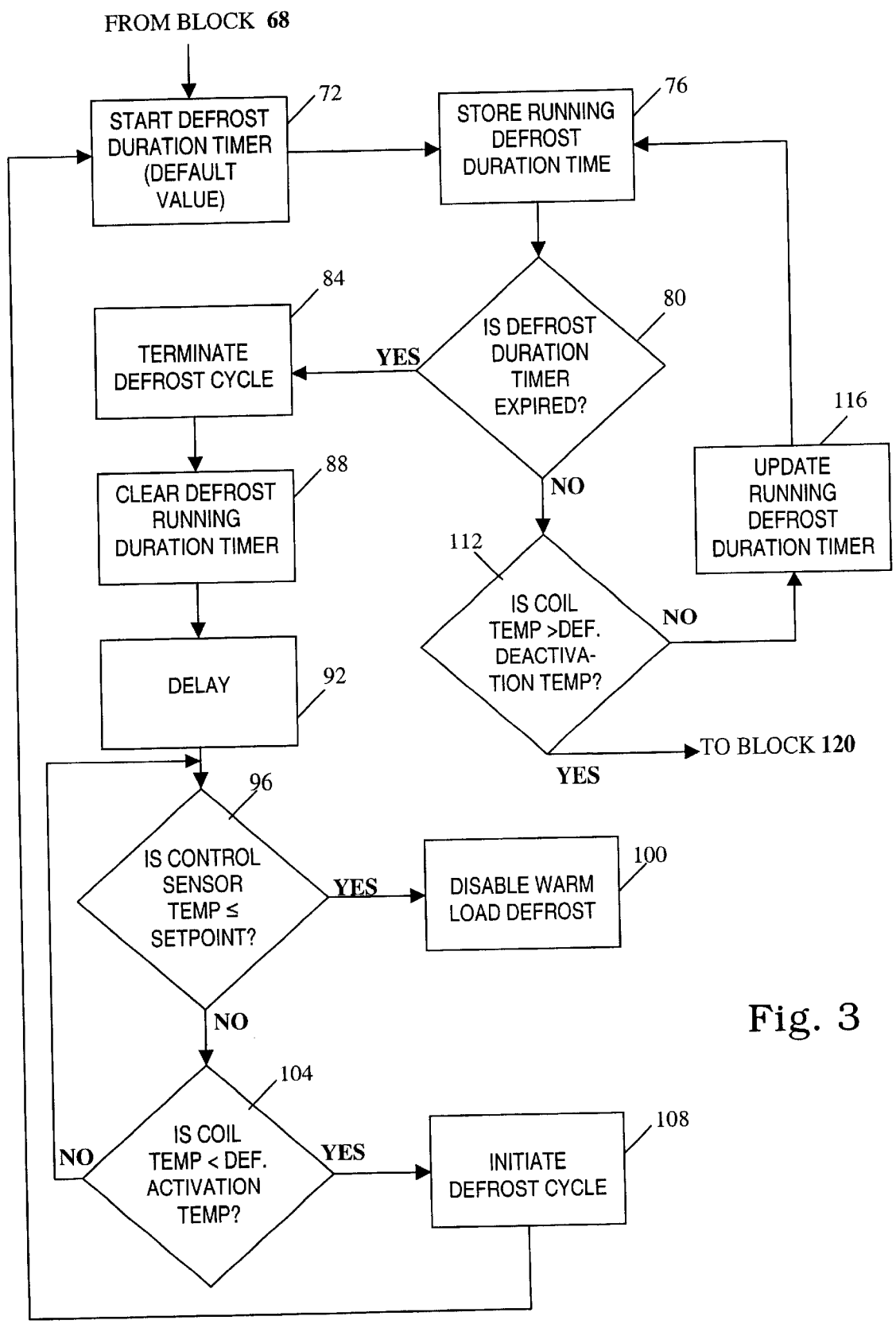

Referring to FIG. 3 and block 72, the defrost duration timer is initiated. The defrost duration timer determines a period of time between the initiation and the termination of the defrost cycle. The period of time is also referred to as a duration time. The duration timer may be programmed with a default maximum duration time. When the duration timer reaches the default maximum duration time, the defrost cycle will terminate. In a preferred embodiment of the present invention, the default maximum duration time is 30 minutes, however, the default maximum duration time may be any amount of time and still be within the intended scope of the present invention.

After block 72 the program proceeds to block 76 where the running defrost duration time is stored. The running defrost duration time is used in other applications and, therefore, is stored for those applications (discussed in greater detail below). After block 76 the program proceeds to block 80 where the program determines if the defrost duration timer is expired. As discussed above, the duration timer expires when the duration timer has reached the default maximum duration time. If the defrost duration timer is expired (YES at block 80), the program proceeds to block 84 where the defrost cycle is terminated. After block 84, the program proceeds to block 88 where the defrost duration timer is cleared.

After block 88, the program proceeds to block 92 where a delay occurs. The delay allows the unit to cool the conditioned space and stabilize the temperature within the conditioned space after the defrost cycle. It is desirable to have a stabilized temperature prior to monitoring the air temperature within the conditioned space to decrease the chances of obtaining a false or biased air temperature reading. In a preferred embodiment of the present invention, the delay is two minutes, however, the delay may be any length of time and still be within the intended scope of the present invention. After block 92, the program proceeds to block 96 where the program determines if the control sensor temperature is less than or equal to the thermal setpoint. If the control sensor temperature is less than or equal to the thermal setpoint (YES at block 96), the program proceeds to block 100 where the warm load defrost is disabled.

Referring back to block 96, if the control sensor temperature is not less than or equal to the thermal setpoint (NO at block 96), the program proceeds to block 104 where the program determines if the coil temperature is less than the defrost activation temperature. If the coil temperature is not less than the defrost activation temperature (NO at block 104), the program returns to block 96. If the coil temperature is less than the defrost activation temperature (YES at block 104), the program proceeds to block 108 where a defrost cycle is initiated. After initiating the defrost cycle, the program returns to block 72.

Referring back to block 80, if the defrost duration timer is not expired (NO at block 80), the program proceeds to block 112 where the program determines if the coil temperature is greater than the defrost deactivation temperature. The defrost deactivation temperature determines the coil temperature at which the defrost cycle will terminate. The defrost cycle terminates when the coil temperature rises above the defrost deactivation temperature. In a preferred embodiment of the present invention, the defrost deactivation temperature is 58° F., however, the defrost deactivation temperature may be any temperature and still be within the intended scope of the present invention. If the coil temperature is not greater than the defrost deactivation temperature (NO at block 112), the program proceeds to block 116 where the defrost duration timer is updated. After updating the duration time, the program returns to block 76 where the updated running defrost duration time is stored. Referring back to block 112, if the coil temperature is greater than the defrost deactivation temperature (YES at block 112), the program proceeds to block 120.

Figure 4:
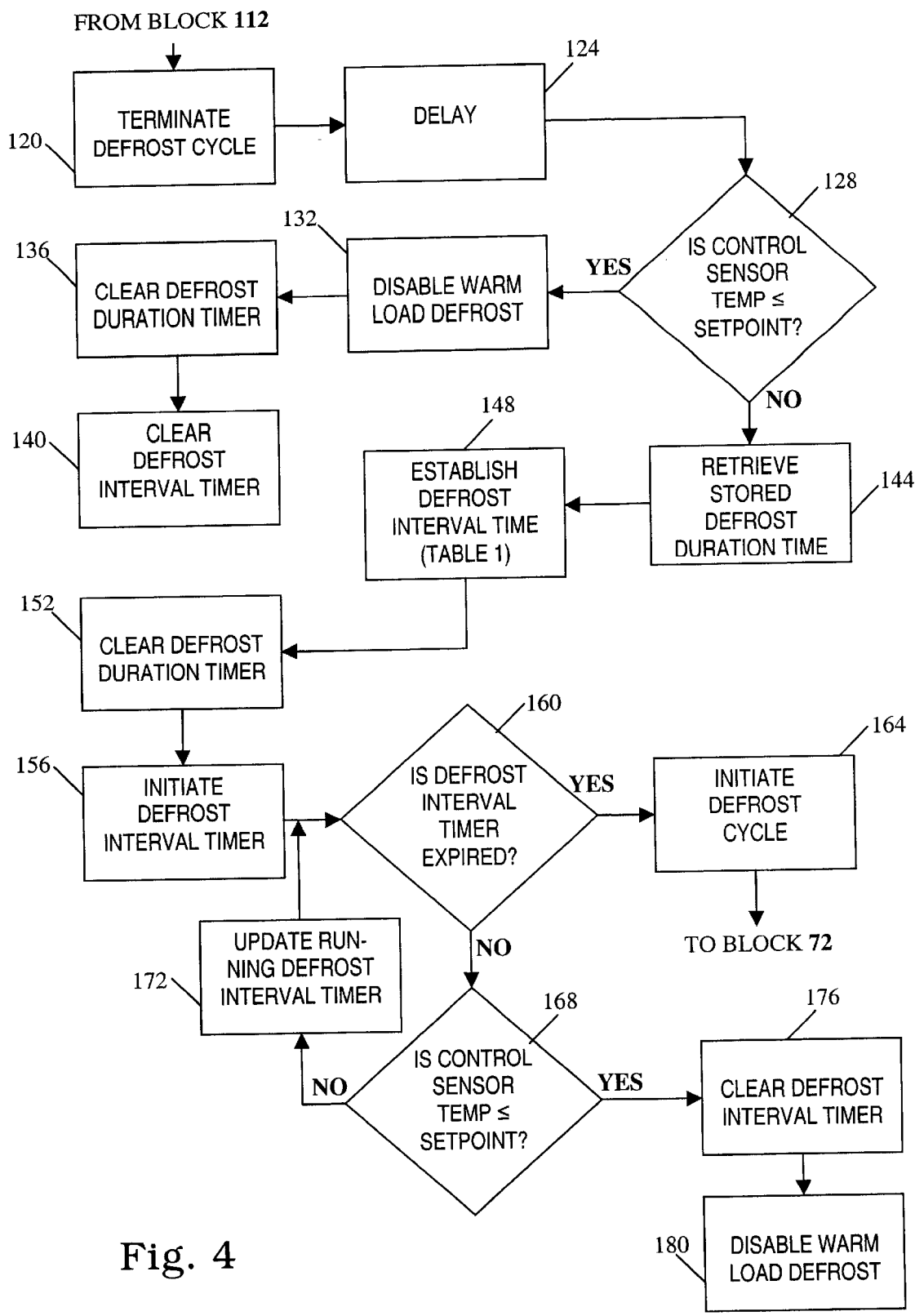

Referring to FIG. 4 and block 120, the defrost cycle is terminated. After terminating the defrost cycle, the program proceeds to block 124 where a delay occurs. The delay allows the unit to cool the conditioned space and stabilize the air temperature within the conditioned space after the defrost cycle. In a preferred embodiment of the present invention, the delay is two minutes, however, the delay may be any length of time and still be within the intended scope of the present invention. After block 124, the program proceeds to block 128 where the program determines if the control sensor temperature is less than or equal to the thermal setpoint. If the control sensor temperature is less than or equal to the thermal setpoint (YES at block 128), the program proceeds to block 132 where the warm load defrost is disabled. After disabling the warm load defrost, the program proceeds to block 136 where the defrost duration timer is cleared. After clearing the defrost duration timer, the program proceeds to block 140 where the interval timer is cleared.

Referring back to block 128, if the control sensor temperature is not less than or equal to the thermal setpoint (NO at block 128), the program proceeds to block 144 where the stored defrost duration time is retrieved. The defrost duration time is retrievable because it was stored at block 76. The stored duration time will be less than the default maximum duration time because the defrost cycle was terminated by coil temperature at block 120 rather than by an expired duration timer at block 84. After retrieving the stored defrost duration time, the program proceeds to block 148 where the defrost interval time is established. In a preferred embodiment of the present invention, the defrost interval time may be established according to sets of defrost interval time adjusting parameters in Table 1 below, however, the interval time may be established using different sets of defrost interval time adjusting parameters and still be within the intended scope of the present invention. The sets of defrost interval time adjusting parameters include time ranges and alterations.

TABLE 1

| If Defrost Duration Time is: | Change Previous Defrost Interval Time (or default) by: |
|---|---|
| ≦30 minutes but > 28 minutes | Subtracting 15 minutes |
| ≦28 minutes but > 27 minutes | Subtracting 14 minutes |
| ≦27 minutes but > 26 minutes | Subtracting 13 minutes |
| ≦26 minutes but > 25 minutes | Subtracting 12 minutes |
| ≦25 minutes but > 24 minutes | Subtracting 11 minutes |

TABLE 1-continued

| If Defrost Duration Time is: | Change Previous Defrost Interval Time (or default) by: |
| --- | --- |
| ≦24 minutes but > 23 minutes | Subtracting 10 minutes |
| ≦23 minutes but > 22 minutes | Subtracting 9 minutes |
| ≦22 minutes but > 21 minutes | Subtracting 8 minutes |
| ≦21 minutes but > 20 minutes | Subtracting 7 minutes |
| ≦20 minutes but > 19 minutes | Subtracting 6 minutes |
| ≦19 minutes but > 18 minutes | Subtracting 5 minutes |
| ≦18 minutes but > 17 minutes | Subtracting 4 minutes |
| ≦17 minutes but > 16 minutes | Subtracting 3 minutes |
| ≦16 minutes but > 15 minutes | Subtracting 2 minutes |
| ≦15 minutes but > 14 minutes | Subtracting 1 minutes |
| ≦14 minutes but > 13 minutes | No Change |
| ≦13 minutes but > 12 minutes | Adding 2 minutes |
| ≦12 minutes but > 11 minutes | Adding 4 minutes |
| ≦11 minutes but > 10 minutes | Adding 6 minutes |
| ≦10 minutes | Adding 10 minutes |

The left column of Table 1 includes time ranges corresponding to the stored defrost duration time and the right column includes alterations that occur to the defrost interval time when the stored default duration time lies within a complementary time range.

The alterations to the defrost interval time potentially increase the cooling efficiency of the unit. By altering the interval time, the temperature control unit can adjust for varying conditions within the conditioned space. Particularly, the conditioned space may have a high moisture content (e.g., caused by warm cargo), which will cause condensate to form on the evaporator coil at a faster rate than a low moisture content. Decreasing the interval time (time between defrost cycles) will move the defrost cycles closer together and compensate for the additional condensate forming on the evaporator coil.

The interval time may be repeatedly altered according to parameters in Table 1 if the program repeatedly proceeds along a particular path. The particular path includes blocks 72, 76, 80, 112, 120, 124, 128, 144, 148, 152, 156, 160, and 164 (blocks 152, 156, 160 and 164 discussed in greater detail below). The particular path may also include blocks 168 and 172 (discussed in greater detail below). After block 164, the program returns to block 72 where the program again proceeds along the particular path, unless the program determines otherwise.

As the program proceeds along the particular path a first time, the default interval time (set at block 52) is altered according to the parameters in Table 1 to create an altered defrost interval time. The program proceeding a second time along the particular path would alter the altered defrost interval time according to the parameters in Table 1 to create a second altered defrost interval time. The alterations to the defrost interval time continue as long as the program proceeds along the particular path.

After block 148, the program proceeds to block 152 where the defrost duration timer is cleared. After the defrost duration timer is cleared, the program proceeds to block 156 where the defrost interval timer initiates. After block 156, the program proceeds to block 160 where the program determines if the defrost interval timer is expired. If the defrost interval timer is expired (YES at block 160) the program proceeds to block 164 where a defrost cycle initiates. After block 164, the program returns to block 72. The program proceeds from block 72 as discussed above.

Referring back to block 160, if the defrost interval timer is not expired (NO at block 160), the program proceeds to block 168 where the program determines if the control sensor temperature is less than or equal to the thermal setpoint. If the control sensor temperature is not less than or equal to the thermal setpoint (NO at block 168), the program proceeds to block 172 where the defrost interval timer is updated. After block 172, the program returns to block 160.

Referring back to block 168, if the control sensor temperature is less than or equal to the thermal setpoint (YES at block 168), the program proceeds to block 176 where the defrost interval timer is cleared. After block 176, the program proceeds to block 180 where the warm load defrost is disabled.

Figure 5:
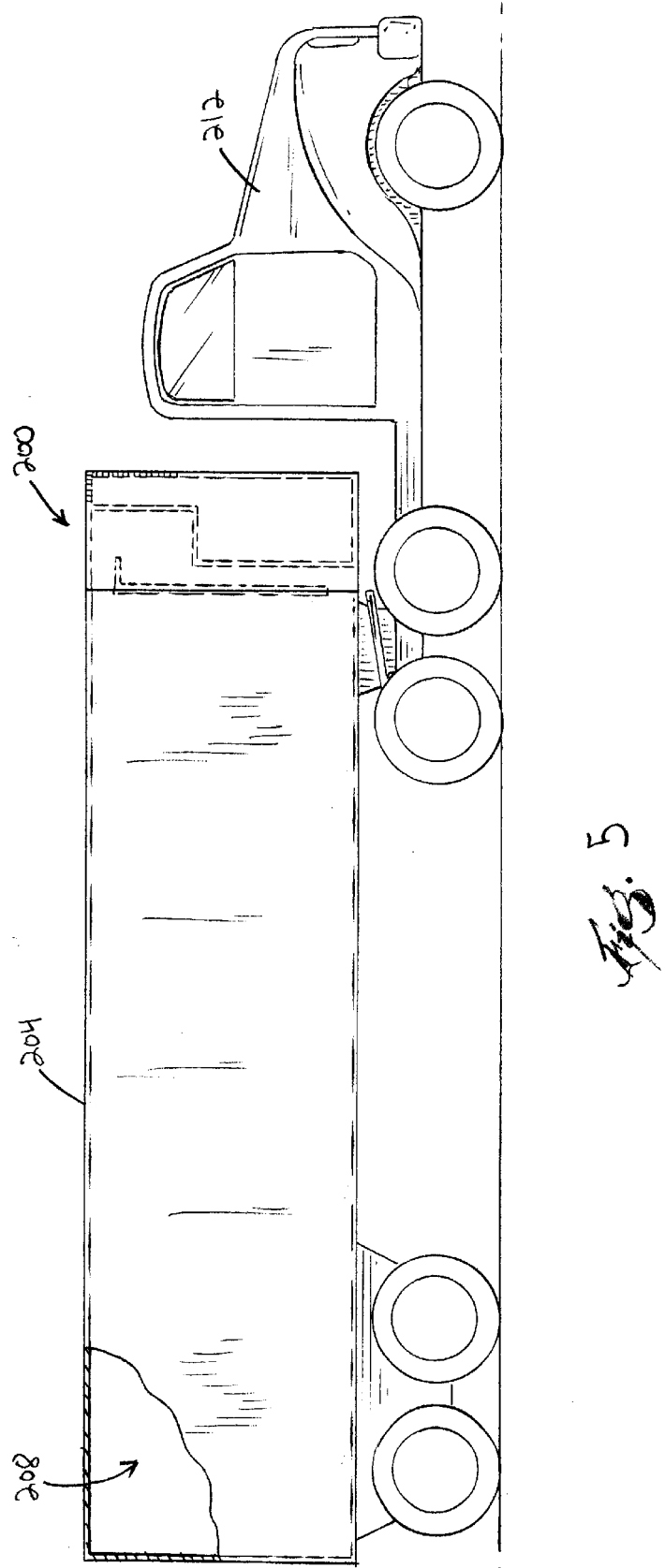
FIG. 5 is a side view, partially in section, of a vehicle having the transport temperature control unit.
Figure 6:
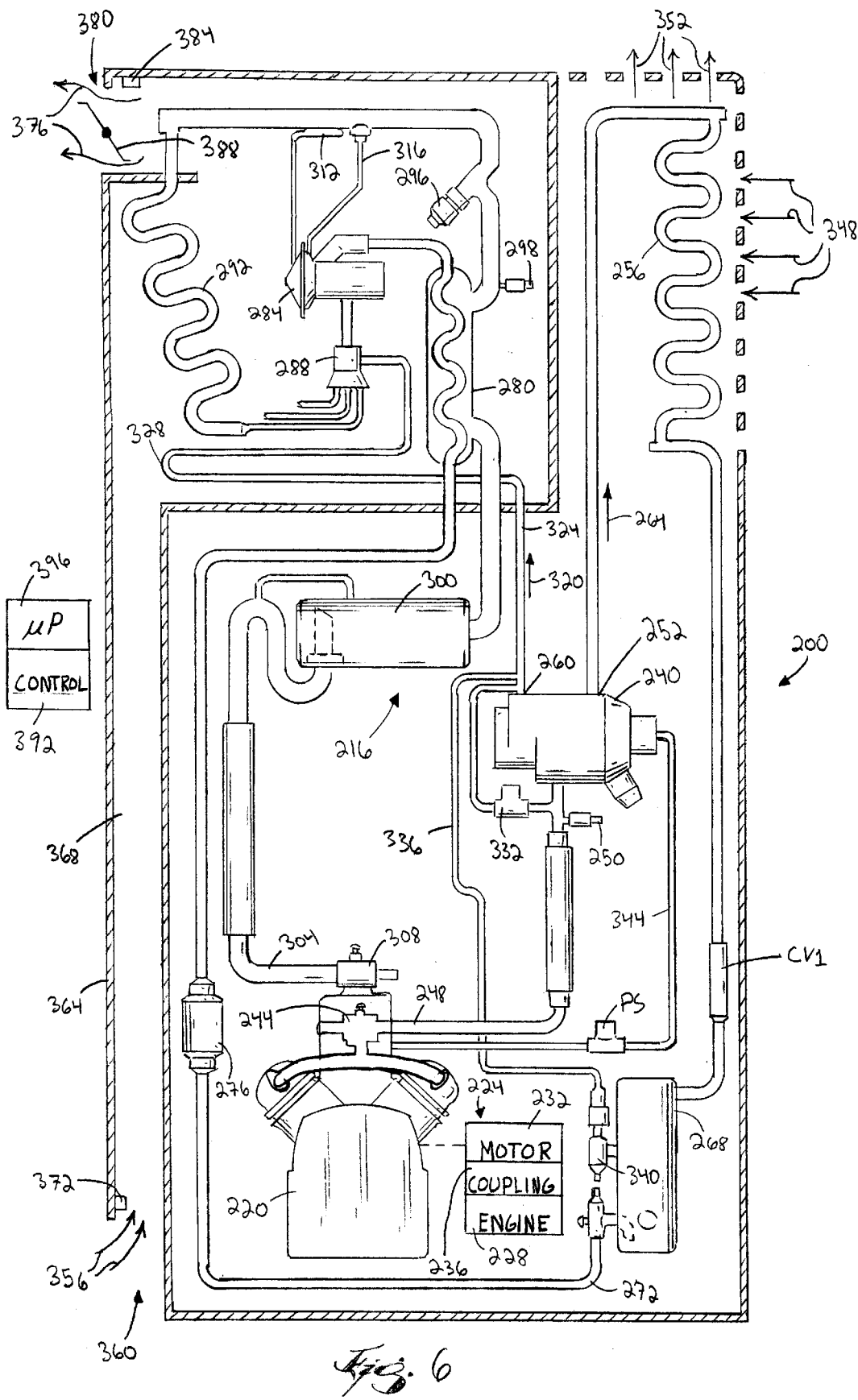
FIG. 6 is a schematic representation of the transport temperature control unit in FIG. 5.

Referring now to FIGS. 5 and 6, there is shown a temperature control unit 200 that may utilize the present inventive method and apparatus. The temperature control unit 200 is especially suitable for use in transport applications and may be mounted on a container, truck, trailer, or any other type of transport vehicle that has a conditioned space that needs to maintain a predetermined temperature to preserve the quality of the cargo. FIG. 5 shows the unit 200 mounted on a trailer 204 having a conditioned space 208. The trailer is pulled by a tractor 212, as is understood by those skilled in the art.

The temperature control unit 200 controls the temperature in the conditioned space 208 to a specified temperature range adjacent to a selected thermal setpoint. The conditioned space 208 may also be divided into a plurality of conditioned spaces having the temperatures in each conditioned space being substantially independently controlled by the temperature control unit 200. As seen in FIG. 6, the temperature control unit 200 has a closed fluid refrigerant circuit or flow path 216 that includes a refrigerant compressor 220 driven by a prime mover arrangement 224. The prime mover arrangement 224 of a preferred embodiment of the present invention includes an internal combustion engine 228 and an optional stand-by electric motor 232. The engine 228 and the motor 232, when both are utilized, are coupled to the compressor 220 by a suitable clutch or coupling 236 which disengages the engine 228 while the motor 232 is operative.

Discharge ports of the compressor 220 are connected to an inlet port of a three-way valve 240 via a discharge service valve 244 and a discharge line 248. A discharge pressure transducer 250 is located in the discharge line 248, upstream of the three-way valve 240, to measure the discharge pressure of the compressed refrigerant. The functions of the three-way valve 240, which selects heating and cooling cycles, may be provided by two separate valves, if desired. The three-way valve 240 has a first outlet port 252, which is selected to initiate a cooling cycle, with the first outlet port 252 being connected to the inlet side of a condenser coil 256. The three-way valve 240 has a second outlet port 260, which is selected to initiate a heating cycle.

When the three-way valve 240 selects the cooling cycle outlet port 252, it connects the compressor 220 in a first refrigerant flow path 264, which in addition to the condenser coil 256, includes a one-way condenser check valve CVI, a receiver 268, a liquid line 272, a refrigerant drier 276, a heat exchanger 280, an expansion valve 284, a refrigerant distributor 288, an evaporator coil 292, an electronic throttling valve 296, a suction pressure transducer 298, another path through the heat exchanger 280, an accumulator 300, a suction line 304, and back to a suction port of compressor 220 via a suction line service valve 308. The expansion valve 284 is controlled by a thermal bulb 312 and an equalizer line 316.

When the three-way valve 240 selects the heating cycle outlet port 260, it connects the compressor 220 in a second refrigerant flow path 320. The second refrigerant flow path 320 by-passes the condenser coil 256 and the expansion valve 284, connecting the hot gas output of compressor 220 to the refrigerant distributor 288 via a hot gas line 324 and a defrost pan heater 328. A hot gas by-pass solenoid valve 332 may optionally be disposed to inject hot gas into the hot gas line 324 during a cooling cycle. A by-pass or pressurizing line 336 connects the hot gas line 324 to the receiver 268 via by-pass and check valves 340, to force refrigerant from the receiver 268 into an active refrigerant flow path during heating and defrost cycles.

A conduit or line 344 connects the three-way valve 240 to the low pressure side of the compressor 220 via a normally closed pilot solenoid valve PS. When the solenoid valve PS is de-energized and thus closed, the three-way valve 240 is spring biased to select the cooling cycle outlet port 252. When the evaporator coil 292 requires defrosting, and when cargo is being conditioned in the conditioned space 208 requires heat to maintain thermal setpoint, the pilot solenoid valve PS is energized and the low pressure side of the compressor 220 operates the three-way valve 240 to select the heating cycle outlet port 260 to initiate a heating cycle or a defrost cycle.

A condenser fan or blower (not shown), which may be driven by the prime mover arrangement 224, causes ambient air 348 to flow through the condenser coil 256, with the resulting heated air 352 being discharged to the atmosphere. An evaporator fan or blower (not shown), which also may be driven by the prime mover arrangement 224, draws air 356, called "return air", from the conditioned space 208, through an inlet 360 in a bulkhead 364 and up through a bulkhead space 368. The bulkhead 364 preferably runs the entire height of the conditioned space 208. A return air temperature sensor 372 samples the air temperature from the bottom of the conditioned space 208.

The resulting conditioned cooled or heated air 376, called "discharge air", is returned or discharged by a fan (not shown) into the conditioned space 208 via an outlet 380. A discharge air temperature sensor 384 samples the air temperature of the discharge air. During an evaporator defrost cycle, a defrost damper 388 may be operated to close the discharge air path to the conditioned space 208. The transport temperature control unit 200 is controlled by an electrical control 392 which includes a microprocessor based controller 396 and electrical control circuits and components, including relays, solenoids, and the like. The controller 396 receives input signals from appropriate sensors, including inputs from a thermal setpoint selector (not shown), which may be actuated to select the desired temperature in the conditioned space 208, an ambient air temperature sensor (not shown), the return air temperature sensor 372, the discharge temperature sensor 384, a coil temperature sensor and switch (not shown) disposed to sense the temperature of the evaporator coil 292, the discharge pressure transducer 250, and the suction pressure transducer 298. The controller 396 provides output signals to, among other things, the electronic throttling valve 296 to control the positioning of the electronic throttling valve 296, as described above.

The algorithm in the form of the computer program discussed above can be programmed into the controller 396 or can be programmed into a separate device to interact with the controller 396.

Although particular embodiments of the present invention have been shown and described, other alternative embodiments will be apparent to those skilled in the art and are within the intended scope of the present invention.

Various features of the invention are set forth in the following claims.

What is claimed is:

1. A method of defrosting an evaporator coil of a transport temperature control unit, the transport temperature control unit being operable to circulate refrigerant through the evaporator coil for cooling a conditioned space within a transportable vehicle and being operable to substantially maintain an air temperature of the conditioned space within a range of a desired temperature, the method comprising:

providing a control sensor;

sensing the air temperature of the conditioned space with the control sensor;

comparing the air temperature and the desired temperature of the conditioned space; and enabling a defrost cycle that is operable to remove condensate from the evaporator coil when the air temperature is greater than the desired temperature.

2. The method as claimed in claim 1, wherein sensing the air temperature of the conditioned space further includes sensing an air temperature of return air, the return air returning to the temperature control unit from the conditioned space.

3. The method as claimed in claim 1, wherein enabling a defrost cycle further includes enabling a defrost cycle that is operable to remove condensate from the evaporator coil when the air temperature is at least ten degrees Fahrenheit greater than the desired temperature.

4. The method as claimed in claim 1, wherein enabling a defrost cycle further includes enabling a defrost cycle that is operable to remove condensate from the evaporator coil when the air temperature is at least fifteen degrees Fahrenheit greater than the desired temperature.

5. The method as claimed in claim 1, further comprising sensing an evaporator coil temperature of the evaporator coil.

6. The method as claimed in claim 5, further comprising comparing the evaporator coil temperature to a defrost activation temperature.

7. The method as claimed in claim 6, further comprising initiating the defrost cycle when the evaporator coil temperature is less than the defrost activation temperature.

8. The method as claimed in claim 1, further comprising initiating the defrost cycle after enabling the defrost cycle.

9. The method as claimed in claim 8, further comprising terminating the defrost cycle, the defrost cycle having a defrost duration time.

10. The method as claimed in claim 9, further comprising establishing a defrost interval time dependent on the defrost duration time.

11. The method as claimed in claim 10, wherein establishing a defrost interval time further includes establishing a defrost interval time from a set of defrost interval time adjusting parameters.

12. The method as claimed in claim 10, wherein establishing a defrost interval time further includes setting a default defrost interval timer with a default defrost interval time.

13. The method as claimed in claim 12, wherein establishing a defrost interval time further includes adjusting the default defrost interval time according to a set of defrost interval time adjusting parameters.

14. A method of defrosting an evaporator coil of a transport temperature control unit, the transport temperature control unit being operable to circulate refrigerant through the evaporator coil for cooling a conditioned space within a transportable vehicle, the method comprising:

initiating a first defrost cycle for removing condensate from the evaporator coil;

terminating the first defrost cycle, the first defrost cycle having a defrost duration time;

storing the defrost duration time;

establishing a defrost interval time dependent on the defrost duration time; and initiating a second defrost cycle after the defrost interval time expires.

15. The method as claimed in claim 14, wherein establishing a defrost interval time further includes establishing the defrost interval time from a set of defrost interval time adjusting parameters.

16. The method as claimed in claim 14, wherein establishing a defrost interval time further includes setting a defrost interval timer with a default defrost interval time.

17. The method as claimed in claim 16, wherein establishing a defrost interval time further includes adjusting the default defrost interval time according to a set of defrost interval time adjusting parameters.

18. The method as claimed in claim 14, further comprising retrieving the defrost duration time.

19. The method as claimed in claim 14, wherein the defrost interval time is a first defrost interval time, the method further comprising terminating the second defrost cycle, the second defrost cycle having a second defrost duration time.

20. The method as claimed in claim 19, further comprising establishing a second defrost interval time dependent on the first defrost interval time and the second defrost duration time.

21. The method as claimed in claim 20, wherein the defrost interval time and the second defrost interval time can be different.

22. The method as claimed in claim 20, further comprising initiating a third defrost cycle after the second defrost interval time expires.

23. A method of defrosting an evaporator coil of a transport temperature control unit, the transport temperature control unit being operable to circulate refrigerant through the evaporator coil for cooling a conditioned space within a transportable vehicle and being operable to substantially maintain an air temperature of the conditioned space within a range of a desired temperature, the method comprising:

sensing the air temperature of the conditioned space;

enabling a warm load defrost when the air temperature of the conditioned space is greater than the desired temperature;

initiating a first defrost cycle for removing condensate from the evaporator coil;

terminating the first defrost cycle, the first defrost cycle having a defrost duration time;

establishing a defrost interval time dependent on the defrost duration time; and initiating a second defrost cycle after the defrost interval time expires.

24. The method as claimed in claim 23, wherein enabling a warm load defrost further includes enabling a warm load defrost when the air temperature of the conditioned space is at least ten degrees Fahrenheit greater than the desired temperature.

25. The method as claimed in claim 23, wherein enabling a warm load defrost further includes enabling a warm load defrost when the air temperature of the conditioned space is at least fifteen degrees Fahrenheit greater than the desired temperature.

26. The method as claimed in claim 23, wherein establishing a defrost interval time further includes establishing a defrost interval time from a set of defrost interval time adjusting parameters.

27. The method as claimed in claim 23, wherein establishing a defrost interval time further includes setting a defrost interval timer with a default defrost interval time.

28. The method as claimed in claim 27, wherein establishing a defrost interval time further includes adjusting the default defrost interval time according to a set of defrost interval time adjusting parameters.

\* \* \* \* \*

UNITED STATES PATENT AND TRADEMARK OFFICE
CERTIFICATE OF CORRECTION

PATENT NO. : 6,609,388 B1                                    Page 1 of 1
DATED      : August 26, 2003
INVENTOR(S) : Jay L. Hanson It is certified that error appears in the above-identified patent and that said Letters Patent is hereby corrected as shown below:

<u>Title page,</u>
Item [56], References Cited, U.S. PATENT DOCUMENTS, insert the following:
-- 4,344,294   Gelbard       08/17/1982
   5,257,506   DeWolf et al. 11/02/1993
   5,363,669   Janke et al.  11/15/1994
   5,369,962   Szynal et al. 12/06/1994
   5,440,893   Davis et al.  08/15/1995
   5,469,715   Janke et al.  11/28/1995
   5,493,867   Szynal et al. 02/27/1996
   5,507,154   Grant         04/16/1996
   5,515,689   Atterbury     05/14/1996
   5,524,449   Ueno et al.   06/11/1996
   5,533,360   Szynal et al. 07/09/1996
   6,205,800   Topper et al. 03/27/2001
   6,263,686   Burkhart      07/24/2001 --

Signed and Sealed this

Twenty-seventh Day of January, 2004

JON W. DUDAS
*Acting Director of the United States Patent and Trademark Office*